(Model.)
J. J. BAILEY.
INSTRUMENT FOR CURING MEATS.
No. 365,895. Patented July 5, 1887.
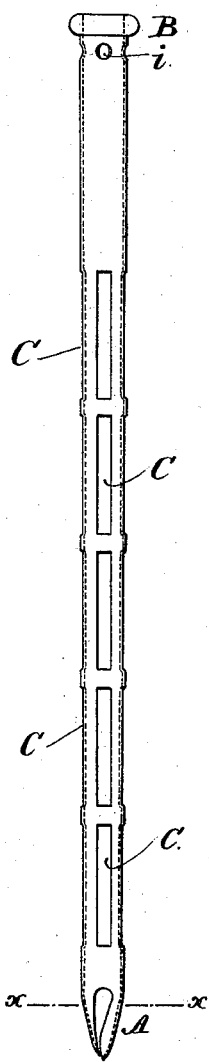
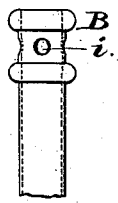
Witnesses:
J. Staib
Chas. H. Smith
Inventor.
John J. Bailey
per Lemuel W. Serrell
atty

United States Patent Office.

JOHN J. BAILEY, OF NEW YORK, N. Y.

INSTRUMENT FOR CURING MEATS.

SPECIFICATION forming part of Letters Patent No. 365,895, dated July 5, 1887.

Application filed July 14, 1886. Serial No. 207,963. (Model.)

*To all whom it may concern:*

Be it known that I, JOHN J. BAILEY, of the city and State of New York, have invented an Improvement in Instruments for Curing Meats, of which the following is a specification.

In curing meats, especially hams, some portions being much thicker than the other, the thinner portions become thoroughly salted before the brine penetrates to the middle of the thicker parts; and great difficulty has heretofore been experienced in properly salting or curing the thick portions of the meat, especially around the bone, and at these places the ham or other meat first commences to decompose. Efforts have been made to introduce salt in a solid condition at these portions of the meat, but the salt itself does not penetrate with uniformity. I make use of a tubular conduit of sheet metal having a pointed end to pass freely into the meat, and longitudinal slots or openings at different places in the sides of the conduit, and there is a head to facilitate the insertion of the tube into the meat by hand. This tubular conduit is represented in the accompanying drawings, in which—

Figure 1 is an elevation. Fig. 2 is a sectional plan at the line *x x*; and Fig. 3 is a modification of the shape of the head.

There is a penetrating point, A, and an enlargement or head, B, and slots or openings at C, which openings are preferably elongated, and some of the openings extend into the point. These tubular conduits are to be provided in sufficient numbers, and they are to be thrust into the ham or other meat at the places where the same is the thickest, and hence is the most difficult to cure, and the brine flows freely into these tubular conduits and reaches the portion of the meat most difficult to cure; and when the curing has been completed the tubular conduits are withdrawn and the meat is ready for market. There is preferably a row of holes, *i*, around the tubular conduit, near the head, to allow the brine to enter should the open end be in contact with another piece of meat. The conduit is of thin sheet metal, and the sheet or strip may be rolled or bent up, and the point is formed by cutting the metal and swaging it to a tapering rounding point, with slots, as shown.

I am aware that in embalming bodies and in salting meat a tubular needle has been used having holes in the same and a connection to the head for a tube through which the preserving liquid is supplied. I therefore do not claim any such device. And in some cases quills or tubes of tin have been inserted into holes made in the meat by an instrument having a solid point.

By my improvement the tube itself without a trocar can be thrust easily into the meat, and will permit the free passage of the brine into the meat, and this due, primarily, to the peculiar construction of the penetrating-point, it being observed that said point is formed integral with the tube by cutting away at opposite sides portions of the metal lengthwise of the tube and then swaging the remaining portions of metal to a tapering point, the said portions being separated, however, sufficiently to permit the brine to escape all the way down to the tip, and yet being sufficiently close together to prevent the meat from entering into and obstructing the tube.

I claim as my invention—

1. A slotted tubular conduit for brine in salting meat, having a tapering penetrating-point integral therewith and slotted or open longitudinally, substantially as set forth.

2. The tubular conduit for the brine in salting meat, having a point at one end, slots or openings along the tube, an open end and head at the other end, and holes around the tube adjacent to the head, substantially as specified.

3. A conduit for brine in salting meat, consisting of a tube of sheet metal, having portions of the metal at one end cut out at opposite points and the remaining portions swaged nearly together and forming a tapering slotted or open penetrating point, substantially as described.

Signed by me this 12th day of July, 1886.

JOHN J. BAILEY.

Witnesses:
GEO. T. PINCKNEY,
WALLACE L. SERRELL.